(12) United States Patent
Liu et al.

(10) Patent No.: US 11,808,695 B2
(45) Date of Patent: Nov. 7, 2023

(54) SINGLE ION DETECTION METHOD AND DEVICE

(71) Applicant: INSTITUTE OF MECHANICS, CHINESE ACADEMY OF SCIENCES, Beijing (CN)

(72) Inventors: Wei Liu, Beijing (CN); Yu Niu, Beijing (CN); Ziren Luo, Beijing (CN)

(73) Assignee: INSTITUTE OF MECHANICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 18/019,485

(22) PCT Filed: Mar. 22, 2022

(86) PCT No.: PCT/CN2022/082157
§ 371 (c)(1),
(2) Date: Feb. 3, 2023

(87) PCT Pub. No.: WO2022/199563
PCT Pub. Date: Sep. 29, 2022

(65) Prior Publication Data
US 2023/0228673 A1   Jul. 20, 2023

(30) Foreign Application Priority Data

Mar. 23, 2021  (CN) .......................... 202110308022.4

(51) Int. Cl.
*G01N 21/21*  (2006.01)
*G01N 21/17*  (2006.01)

(52) U.S. Cl.
CPC ... *G01N 21/211* (2013.01); *G01N 2021/1765* (2013.01); *G01N 2021/212* (2013.01)

(58) Field of Classification Search
CPC ......... G01N 21/211; G01N 2021/1765; G01N 2021/212; G01N 21/553; G01N 21/17; G01N 2021/1772
(Continued)

(56) References Cited

U.S. PATENT DOCUMENTS

| | | | |
|---|---|---|---|
| 3,975,238 A | 8/1976 | Bean et al. | |
| 8,040,521 B2 * | 10/2011 | Pfaff | G01R 31/311 356/521 |

(Continued)

FOREIGN PATENT DOCUMENTS

| | | |
|---|---|---|
| CN | 201440126 U | 4/2010 |
| CN | 102042972 A | 5/2011 |

(Continued)

*Primary Examiner* — Kiet T Nguyen
(74) *Attorney, Agent, or Firm* — Bayramoglu Law Offices LLC

(57) ABSTRACT

A single ion imaging-based detection method and device are provided. After being reflected by an electromodulation singularity coupling differential imaging reaction unit, a probe beam from a total internal reflection ellipsometry imager converges on a CCD or CMOS detector, the acquired sensing surface image data is transmitted to a signal processing unit, the common mode noise is eliminated by performing spectral analysis on differential signals of a working sensing surface and a reference sensing surface, the peak intensity of a modulating signal is selected on the spectrum for wave filtering to obtain a real-time signal of interaction of single ions or charged molecules at a solid-liquid interface. Based on the singularity effect at a surface plasma resonance angle of an ellipsometry phase and a corresponding optical signal noise suppression scheme, the present application can achieve real-time observation of the adsorption of single ions or charged molecules at a solid surface.

10 Claims, 3 Drawing Sheets

(58) Field of Classification Search
USPC .................................................. 250/282, 281
See application file for complete search history.

(56) References Cited

U.S. PATENT DOCUMENTS

| | | | |
|---|---|---|---|
| 2008/0049224 A1 | | 2/2008 | Otsuki et al. |
| 2021/0249219 A1* | | 8/2021 | Woehl .................... H01J 37/20 |

FOREIGN PATENT DOCUMENTS

| | | | |
|---|---|---|---|
| CN | 110739199 | A | 1/2020 |
| CN | 111208066 | A | 5/2020 |
| CN | 111487190 | A | 8/2020 |
| CN | 112964648 | A | 6/2021 |
| EP | 3066455 | A1 | 9/2016 |

* cited by examiner

SINGLE ION DETECTION METHOD AND DEVICE

CROSS REFERENCE TO THE RELATED APPLICATIONS

This application is the national phase entry of International Application No. PCT/CN2022/082157, filed on Mar. 22, 2022, which is based upon and claims priority to Chinese Patent Application No. 202110308022.4, filed on Mar. 23, 2021, the entire contents of which are incorporated herein by reference.

TECHNICAL FIELD

The invention relates to technical fields of optical precision measurement, and particularly to a single ion detection method and device.

BACKGROUND

Analysis of the interaction of ions or charged molecules on the solid surface is of great significance for revealing the molecular mechanism in many physical, chemical and biological processes. However, in the solution, single ion is difficult to characterize due to small size and susceptibility to liquid phase disturbance, and in particular, imaging analysis tools effective to systematically analyze the interaction of ions or charged molecules in the solution are lacking.

At present, the common optical sensing technologies include oblique-incidence reflection difference scanning imaging devices, reflection interference spectral imagers, resonant waveguide grating sensors, etc. However, the above technologies are difficult to realize or achieve ideal effects in the detection of single ions or charged molecules.

The total internal reflection ellipsometry biosensor is an optical biosensor that can be used in studying the adsorption behavior of biomolecules on the solid surface. Such a sensor uses the changes in optical properties such as spectral absorption, reflection, and refractive index caused by the adsorption of biomolecules on the solid surface as a detection method, which has the advantages of high throughput, little damage to biological samples, capability of detecting films with sub-nanometer thickness, etc. At the same time, due to the avoidance of complicated pretreatment steps for the samples to be detected, the total internal reflection ellipsometry biosensor can be used for real-time, high-throughput sample detection, resulting in a wide range of applications in many fields such as biomedical research, disease diagnosis, pharmaceuticals, food safety, and environmental monitoring.

However, with the continuous improvement of medical level and the awareness of health and environmental protection, people put forward higher requirements for the total internal reflection ellipsometry biosensor in terms of early detection of diseases, pharmacological analysis and detection of micropollution. The conventional total internal reflection ellipsometry biosensor has high detection sensitivity for biological macromolecules such as proteins, but for single ions or charged small biomolecules such as amino acids, has problems of low sensitivity and the inability to effectively analyze the interaction of charged small biomolecules.

SUMMARY

In consideration of the problems of insufficient sensitivity and the inability to analyze the interaction of single ions or charged small molecules in optical biosensors of the conventional technologies, the object of the present invention is to provide a single ion imaging-based detection method and device, which can be used in real-time detection of single ions or charged molecules in the solution. On the basis of the singularity effect at a surface plasma resonance angle on an ellipsometry phase and a corresponding optical signal noise suppression scheme, the present invention can achieve the real-time observation of the adsorption of single ions or charged molecules on a solid surface and the physicochemical reaction thereof.

The object of the present invention is achieved by the following technical solutions.

A single ion imaging detection method, comprises:
(1) applying, by a signal generator, a high-frequency sinusoidal modulating signal to a working sensing surface of an electromodulation singularity coupling differential imaging reaction unit, so as to perform Fourier analysis and filtering on the acquired signals,
(2) after a probe beam from a total internal reflection ellipsometry imager is reflected by the electromodulation singularity coupling differential imaging reaction unit, converging the probe beam on a CCD or CMOS detector of the total internal reflection ellipsometry imager, so as to obtain original images of target-containing samples adsorbed on the surface,
(3) transmitting sensing surface image data acquired via the CCD or CMOS detector to a signal processing unit, so as to process the original image signal acquired in the step (1),
(4) selecting, by the single processing unit, area images of the same size on the working sensing surface and a reference sensing surface in a differential imaging reaction unit, so as to obtain a working area signal intensity $I_0(t)$ and its mean value $\overline{I}_0$, a reference area signal intensity $I_r(t)$ and its mean value $\overline{I}_r$, carrying out $$S = I_0(t) - \frac{\overline{I}_0}{\overline{I}_r}(I_r(t) - \overline{I}_r)$$

inversion to calculate a differential signal S of a single ion or charged molecule at the solid-liquid interface on the sensing surface of the reaction unit, carrying out Fourier transform on the differential signal S, and selecting the peak of a modulating signal on the spectrum for filtering and noise reduction, so as to obtain the sensing signal acquired when the single ion is adsorbed on the sensing surface.

Furthermore, in the said step (1), reference solutions and solutions containing target ions are transported through a micro-channel unit into the electromodulation singularity coupling differential imaging reaction unit.

A single ion imaging detection device, which adopts the single ion imaging detection method, comprises a total internal reflection ellipsometry imager, an electromodulation singularity coupling differential imaging reaction unit, a signal generator and a signal processing unit, wherein
the said total internal reflection ellipsometry imager generates a probe beam and acquires real-time image data of the interaction of single ions or charged molecules at a solid-liquid interface on the sensing surface,
the said electromodulation singularity coupling differential imaging reaction unit acquires real-time signals of a working unit and a reference unit near the ellipsometry phase transition singularity in the vicinity of the surface plasmon resonance angle, the said signal generator includes a positive pole connected to the sensing surface of the working unit, and a negative pole connected to a platinum wire counter electrode of the working unit, and the signal generator applies a sinusoidal modulating signal to the surface of the working unit, the said signal processing unit carries out differential spectrum analysis on the acquired optical image signals of a working sensing surface and a reference sensing surface of the singularity coupling differential imaging reaction unit, and carries out inversion to obtain physicochemical reaction information of single ions and charged molecules at the solid-liquid interface.

Furthermore, the electromodulation singularity coupling differential imaging reaction unit includes a coupling prism of which an inclination angle is a surface plasmon resonance angle of the probe beam, a total internal reflection sensing substrate, and a differential imaging reaction unit, wherein a reflection surface of the coupling prism coincides with a glass substrate of the total internal reflection sensing substrate, and a coating layer of the total internal reflection sensing substrate is in contact with the differential imaging reaction unit.

Furthermore, the said differential imaging reaction unit comprises at least two independent reaction chambers, of which the diameters are both set to 5 mm and the spacing therebetween is equal to or smaller than 1 mm, and one of the two independent reaction chambers is used as the working unit while the other is used as the reference unit.

Furthermore, the said total internal reflection sensing substrate is cut along the center line to be separated into two substrate surfaces, one of which is the working surface and the other is the reference surface.

Furthermore, further comprising a micro-channel unit, configured to transport solutions containing target ions to a working sensing surface of the electromodulation singularity coupling differential imaging reaction unit, and transport reference solutions to a reference sensing surface.

Furthermore, further comprising a noise isolation system in which the total internal reflection ellipsometry imager and the singularity coupling differential imaging reaction unit are assembled.

The beneficial effects of the present invention are as follows.

The present invention can acquire the real-time signal generated when single ions are adsorbed on the surface at the solid-liquid interface, and the detection sensitivity can reach the level of single-molecule detection. Meanwhile, different from the conventional detection method based on optical scattering technology, the present invention can even detect small ions such as lithium ions, free of restriction by the size of the scattering interface of target molecules.

The single ion imaging detection device comprises a total internal reflection ellipsometry imager, configured to generate a probe beam and acquire real-time image data of the interaction of single ions or charged molecules at the solid-liquid interface on the sensing surface; an electromodulation singularity coupling differential imaging reaction unit, configured to acquire real-time signals of the working unit and the reference unit near the ellipsometry phase transition singularity in the vicinity of the surface plasmon resonance angle; a signal generator, configured to apply a sinusoidal modulating signal to the surface of the working unit; a signal processing unit, configured to carry out differential spectrum analysis on the acquired optical signals of the working sensing surface and the reference sensing surface of the singularity differential imaging reaction unit, and perform inversion to obtain the physicochemical reaction information of single ions and charged molecules at the solid-liquid interface.

Compared with the conventional technologies, on the basis of the characteristics of real time, high throughput, and high sensitivity to the dielectric constant of the solid surface of the total internal reflection ellipsometry technology, by utilizing the singularity effect at the surface plasmon resonance angle on the ellipsometry phase, applying the sinusoidal modulating signal to the sensing surface at the same time, and adopting the corresponding optical signal noise suppression scheme, the present invention can achieve real-time observation of the adsorption of single ions or other charged molecules on the solid surface and the physicochemical reactions thereof.

Figure 5:
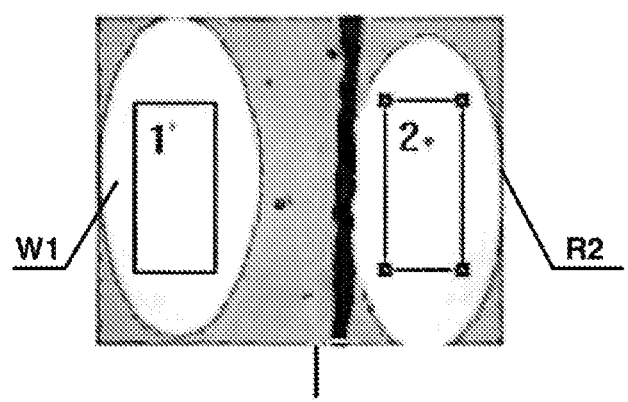
FIG. 5 is an exemplary diagram of a single ion imaging reaction unit.

Where 1 indicates a total internal reflection ellipsometry imager; 2 indicates a sinusoidal potential modulation singularity coupling differential imaging reaction unit; 3 indicates a signal generator; 4 indicates a signal processing unit; 5 indicates a noise isolation system; 6 indicates a working chamber; and 7 indicates a reference chamber;

In FIG. 5, area 1 indicates the selected image of the working sensing surface, and area 2 indicates the selected image of the reference sensing surface.

DETAILED DESCRIPTION OF THE EMBODIMENTS

The specific embodiments of the present application will be further described below with reference to the accompanying drawings and examples. The following examples are intended to illustrate the application, but not to limit the scope of the application.

Figure 1:
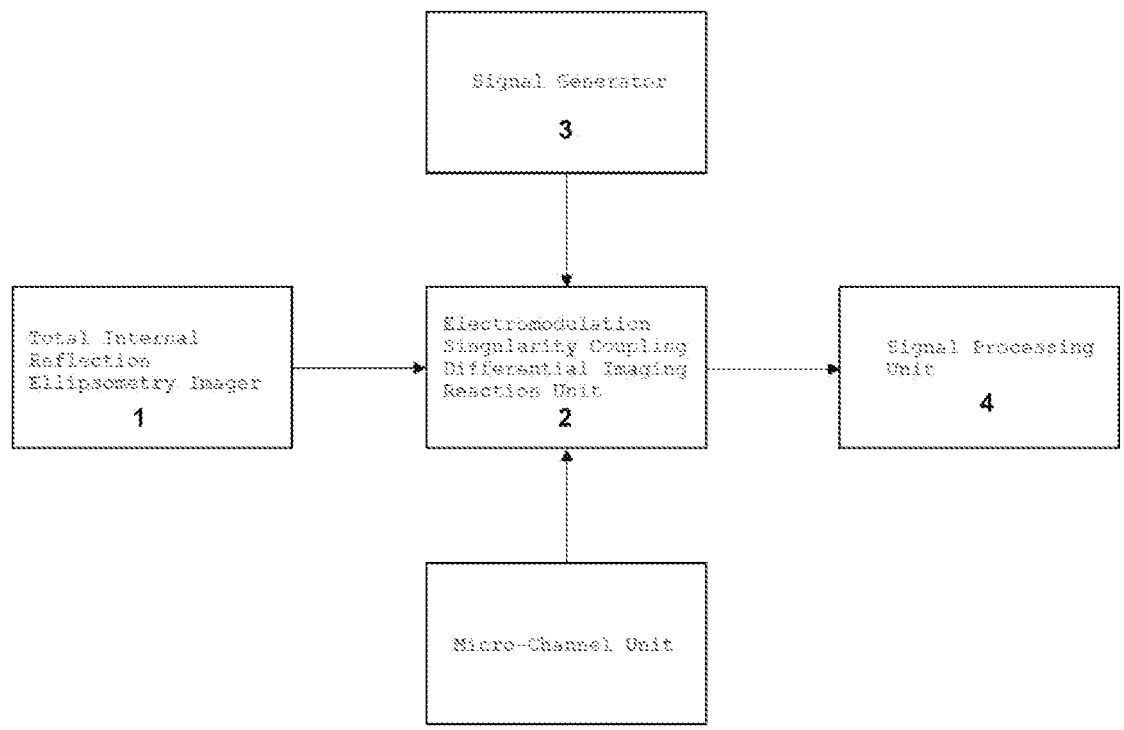
FIG. 1 is a schematic diagram of a single ion imaging detection method.

As shown in FIG. 1, a single ion imaging detection method in this embodiment comprises the following steps:

(1) applying, by a signal generator 3, a high-frequency sinusoidal modulating signal to a working sensing surface W1 of an electromodulation singularity coupling differential imaging reaction unit 2, so as to perform Fourier analysis and filtering on the acquired signals, (2) after a probe beam from a total internal reflection ellipsometry imager 1 is reflected by the electromodulation singularity coupling differential imaging reaction unit 2, converging the reflected light, which contains adsorption information of single ions on the sensing surface W1 to a CCD or CMOS detector of the total internal reflection ellipsometry imager 1, so as to obtain original images of target-containing samples adsorbed on the surface, (3) transmitting sensing surface image data acquired via the CCD or CMOS detector to a signal processing unit 4, so as to process the original image signal acquired in the step (1), (4) selecting, by the single processing unit 4, area images of the same size on the working sensing surface W1 and a reference sensing surface R2 in a differential imaging reaction unit 2, so as to obtain a working area signal intensity $I_0(t)$ and its mean value $\bar{I}_0$, a reference area signal intensity $I_r(t)$ and its mean value $\bar{I}_r$, carrying out $$S = I_0(t) - \frac{\bar{I}_0}{\bar{I}_r}(I_r(t) - \bar{I}_r)$$

inversion to calculate a differential signal S of a single ion or charged molecule at the solid-liquid interface on the sensing surface W1 of the reaction unit 2, carrying out Fourier transform on the differential signal S, and selecting the peak of a modulating signal on the spectrum for filtering and noise reduction, so as to obtain the sensing signal acquired when the single ion is adsorbed on the sensing surface.

Figure 2:
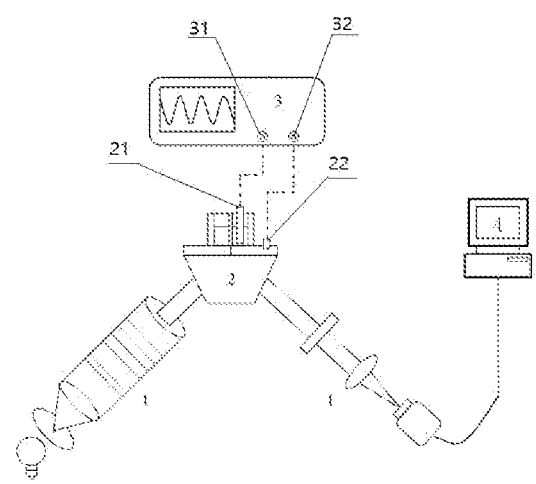
FIG. 2 is a schematic diagram of a single ion imaging detection device.
Figure 3:
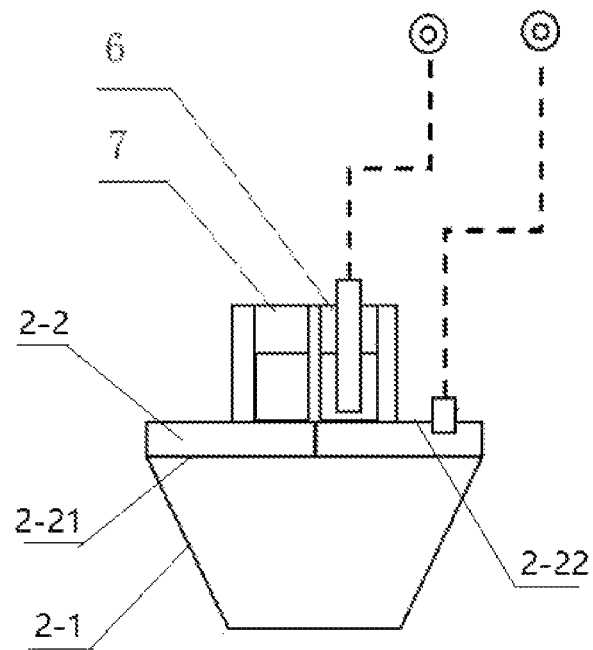
FIG. 3 is a schematic diagram of an electromodulation singularity coupling differential imaging reaction unit.
Figure 4:
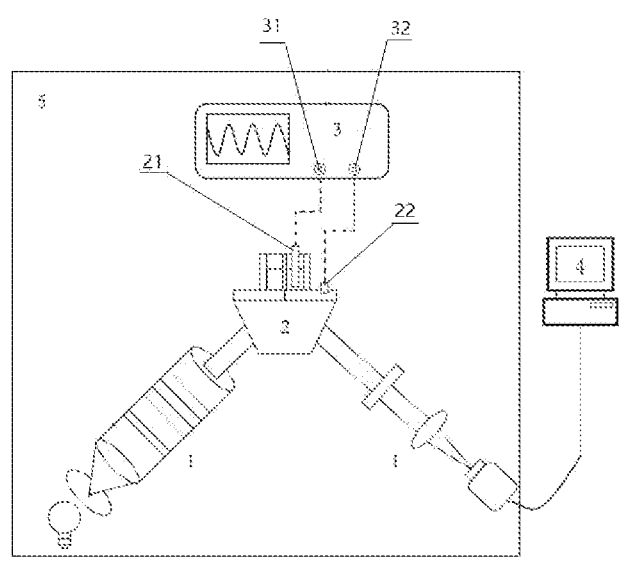
FIG. 4 is a schematic diagram of an embodiment of the single ion imaging detection device.

A device shown in FIG. 2, FIG. 3, and FIG. 4, which is adopted to carry out the single ion imaging detection, comprises a total internal reflection ellipsometry imager 1, an electromodulation singularity coupling differential imaging reaction unit 2, a signal generator 3, a signal processing unit 4, and a noise isolation system 5.

The total internal reflection ellipsometry imager 1 in the present embodiment generates a quasi-parallel probe beam for 633 nanometers detection, which is incident to the electromodulation singularity coupling differential imaging reaction unit 2 at 58°, and the reflected light wave is recorded and imaged by a CCD, of which the imaging time resolution is 0.1 s.

The electromodulation singularity coupling differential imaging reaction unit 2 includes a coupling prism of which the inclination angle is a surface plasmon resonance angle of the probe beam 2-1, a total internal reflection sensing substrate 2-2, and a differential imaging reaction unit 2, wherein a reflection surface of the coupling prism 2-1 coincides with a glass substrate 2-21 of the total internal reflection sensing substrate 2-2, and a coating layer 2-22 of the total internal reflection sensing substrate 2-2 is in contact with the differential imaging reaction unit 2.

The said total internal reflection sensing substrate 2-2 is cut along the center line to be separated into two substrate surfaces, one of which is the working surface and the other is the reference surface, as shown in FIG. 5.

Specifically, in the present embodiment, the sinusoidal potential modulation singularity coupling differential imaging reaction unit 2 includes an SF10 singularity coupling prism with an inclination angle of 58°, an SF10 substrate coated with a 48-nanometer gold film, and a differential imaging reaction unit 2, which includes a working chamber 6 and a reference chamber 7 independent of each other. The diameters of the working chamber 6 and the reference chamber 7 are both equal to or smaller than 5 mm, the spacing between the two chambers is equal to or smaller than 1 mm, and the capacities are both about 200 microliters. A wire, which is provided in the contact part between the working chamber 6 and the sensing surface W1, is connected to the positive electrode of the signal generator. The working chamber 6 is provided with a platinum wire as a counter electrode 22 connected to the negative electrode of the signal generator, and is configured to acquire real-time optical signal of adsorption of the solution containing target ions at the solid-liquid interface. The reference chamber 7 is configured to acquire the optical signal of the solvent at the solid-liquid interface during the sampling process.

The signal generator includes a positive pole 31 connected to the sensing surface W1 of the working unit 21, and a negative pole 32 connected to a platinum wire counter electrode 22 of the working unit 21, so as to apply a sinusoidal modulating signal to the surface of the working unit 21. In the present embodiment, the modulation frequency of the signal generator is 1.1 Hz, the signal amplitude is 1 V, and the signal reference bias is 0 V.

The signal processing unit carries out differential and spectrum expansion on the acquired optical image signals of the working area 1 and the reference area 2 in FIG. 5, and carries out filtering for the peak of the modulating signal, and performs inversion to obtain physicochemical reaction information of single ions and charged molecules at the solid-liquid interface.

A micro-channel unit is further comprised, which transports the solution containing target ions to a working sensing surface W1 of the electromodulation singularity coupling differential imaging reaction unit 2, and transports reference solutions to a reference sensing surface R2.

As shown in FIG. 4, the noise isolation system 5 is configured to isolate low-frequency noise such as temperature and foundation vibration. According to the system, the temperature drift within the measurement period is kept less than <0.1° C.

Finally, the method of the present application is merely shown as a preferred embodiment, but is not intended to limit the protection scope of the present application. Any modifications, equivalent replacements, improvements, etc. made within the spirit and principles of the present application shall fall within the protection scope of the present application.

What is claimed is:

1. A single ion imaging detection method, comprising:
   (1) applying, by a signal generator (3), a high-frequency sinusoidal modulating signal to a working sensing surface (W1) of an electromodulation singularity coupling differential imaging reaction unit (2), wherein the signal generator comprises a positive pole (31) connected to a sensing surface (W1) of a working unit (21) and a negative pole (32) connected to a platinum wire counter electrode (22) of the working unit and is configured to apply a sinusoidal modulating signal to the surface of the working unit;
   (2) after a probe beam from a total internal reflection ellipsometry imager (1) is reflected by the electromodulation singularity coupling differential imaging reaction unit (2), converging the probe beam on a detector of the total internal reflection ellipsometry imager (1),
   (3) transmitting sensing surface image data acquired via a CCD or CMOS detector to a signal processing unit (4), and
   (4) selecting, by the signal processing unit (4), area images of a same size on the working sensing surface and a reference sensing surface (R2) in the electromodulation singularity coupling differential imaging reaction unit (2), so as to obtain a working area signal intensity $I_0(t)$ and its mean value $\bar{I}_0$, a reference area signal intensity $I_r(t)$ and its mean value $\bar{I}_r$ within a specific integration time, carrying out a $$S = I_0(t) - \frac{\overline{I_0}}{\overline{I_r}}(I_r(t) - \overline{I_r})$$

inversion to calculate a differential signal S of a single ion or a charged molecule at a solid-liquid interface on the working sensing surface (W1) of the electromodulation singularity coupling differential imaging reaction unit, carrying out a Fourier transform on the differential signal S, and selecting a peak of a modulating signal on a spectrum for filtering and a noise reduction.

2. The single ion imaging detection method according to claim 1, wherein
in the step (1), a reference solution and a solution containing target ions are transported through a micro-channel unit into the electromodulation singularity coupling differential imaging reaction unit (2).

3. A single ion imaging detection device, using the single ion imaging detection method according to claim 1, comprising:
the total internal reflection ellipsometry imager (1), the electromodulation singularity coupling differential imaging reaction unit (2), the signal generator (3), and the signal processing unit (4), wherein
the total internal reflection ellipsometry imager (1) generates the probe beam and acquires real-time image data of an interaction of the single ion or the charged molecule at the solid-liquid interface on the working sensing surface,
the electromodulation singularity coupling differential imaging reaction unit (2) acquires real-time signals of the working unit (W1) and a reference unit (R2) near an ellipsometry phase transition singularity in a vicinity of a surface plasmon resonance angle,
the signal generator (3) comprises the positive pole connected to the sensing surface of the working unit and the negative pole connected to the platinum wire counter electrode of the working unit and applies the sinusoidal modulating signal to the surface of the working unit,
the signal processing unit (4) carries out a differential spectrum analysis on acquired optical image signals of the working sensing surface (W1) and the reference sensing surface (R2) of the electromodulation singularity coupling differential imaging reaction unit (2) and carries out an inversion to obtain physicochemical reaction information of the single ion and the charged molecule at the solid-liquid interface.

4. The single ion imaging detection device according to claim 3, wherein
the electromodulation singularity coupling differential imaging reaction unit (2) comprises a coupling prism with an inclination angle being a surface plasmon resonance angle of the probe beam (2-1), a total internal reflection sensing substrate (2-2), and a differential imaging reaction unit, wherein a reflection surface of the coupling prism (2-1) coincides with a glass substrate (2-21) of the total internal reflection sensing substrate (2-2), and a coating layer (2-22) of the total internal reflection sensing substrate (2-2) is in contact with the differential imaging reaction unit.

5. The single ion imaging detection device according to claim 4, wherein
the coupling prism (2-1) has an inclination angle of about 58° for an incident probe beam of 633 nm.

6. The single ion imaging detection device according to claim 4, wherein
the differential imaging reaction unit comprises at least two independent reaction chambers, a diameter of each of the at least two independent reaction chambers is set to 5 mm, and a spacing between the at least two independent reaction chambers is equal to or smaller than 1 mm, and one of the at least two independent reaction chambers is used as the working unit, while the other of the at least two independent reaction chambers is used as the reference unit.

7. The single ion imaging detection device according to claim 4, wherein
the total internal reflection sensing substrate (2-2) is cut along a center line to be separated into two substrate surfaces, one of the two substrate surfaces is the working surface and the other pf the two substrate surfaces is a reference surface.

8. The single ion imaging detection device according to claim 3, further comprising:
a micro-channel unit, configured to transport a solution containing target ions to the working sensing surface of the electromodulation singularity coupling differential imaging reaction unit (2) and transport a reference solution to the reference sensing surface.

9. The single ion imaging detection device according to claim 3, further comprising:
a noise isolation system (5), wherein the total internal reflection ellipsometry imager (1) and the electromodulation singularity coupling differential imaging reaction unit (2) are assembled in the noise isolation.

10. The single ion imaging detection device according to claim 3, wherein in the step (1) of the single ion imaging detection method, a reference solution and a solution containing target ions are transported through a micro-channel unit into the electromodulation singularity coupling differential imaging reaction unit (2).

* * * * *